United States Patent [19]
Nakamura et al.

[11] Patent Number: 5,842,066
[45] Date of Patent: *Nov. 24, 1998

[54] FILM FEED CONTROL APPARATUS

[75] Inventors: Toshiyuki Nakamura; Youichi Yamazaki, both of Tokyo, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 690,080

[22] Filed: Jul. 31, 1996

[30] Foreign Application Priority Data

Aug. 4, 1995 [JP] Japan ................................. 7-199479

[51] Int. Cl.$^6$ ............................................ G43B 1/00
[52] U.S. Cl. ................................... 396/409; 396/277
[58] Field of Search ................................. 396/408, 409, 396/406, 277, 280

[56] References Cited

U.S. PATENT DOCUMENTS

| | | | |
|---|---|---|---|
| 4,443,084 | 4/1984 | Harada et al. | 354/173.1 |
| 4,571,044 | 2/1986 | Wakabayashi | 354/173.11 |
| 4,973,996 | 11/1990 | Harvey | 354/106 |
| 5,124,735 | 6/1992 | Tsukahara et al. | 354/106 |
| 5,225,865 | 7/1993 | Shiomi et al. | 354/412 |
| 5,506,648 | 4/1996 | Kazami et al. | 354/173.1 |
| 5,530,503 | 6/1996 | Takahashi et al. | 354/173.1 |
| 5,532,775 | 7/1996 | Soshi et al. | 354/106 |
| 5,543,878 | 8/1996 | Murakami | 354/173.1 |
| 5,548,363 | 8/1996 | Ohtsuka | 354/173.1 |
| 5,576,785 | 11/1996 | Kazami et al. | 396/397 |

FOREIGN PATENT DOCUMENTS

| | | |
|---|---|---|
| A-4-180046 | 6/1992 | Japan . |
| A-4-212943 | 8/1992 | Japan . |
| A-4-213441 | 8/1992 | Japan . |
| A-5-40297 | 2/1993 | Japan . |
| A-5-127237 | 5/1993 | Japan . |
| A-5-142612 | 6/1993 | Japan . |

*Primary Examiner*—Eddie C. Lee
*Assistant Examiner*—John Chizmar
*Attorney, Agent, or Firm*—Oliff & Berridge, PLC

[57] ABSTRACT

A film feed control apparatus feeds film with an electrical feeding mechanism in a film feeding direction and stops the film at predetermined positions. The film includes a plurality of photo frames. A predetermined number of perforations having edges at leading and trailing sides of the film are defined at predetermined positions at the photo frames. An edge detector detects edges of the perforations of the film as the film is fed in the feeding direction. A physical amount detector detects a physical amount that relates to an amount of film that is fed from a time when the film feeding starts to a time when an edge of a predetermined perforation is detected. The physical amount detector also detects a physical amount that relates to an amount of film that is fed from the time when the edge of the predetermined perforation is detected to a time when another edge is detected. A controller determines a time, subsequent to the time when film feeding starts, for the feeding mechanism to stop feeding the film based upon a number of edges detected by the edge detector and the physical amounts detected by the physical amount detector.

24 Claims, 10 Drawing Sheets

WINDING DIRECTION

WINDING DIRECTION

FILM FEED CONTROL APPARATUS

BACKGROUND OF THE INVENTION

1. Field of the Invention

The present invention relates to a film feed control apparatus for use in a camera, and more particularly, to such an apparatus equipped to handle removal of the power source during film feeding.

2. Description of Related Art

Conventional cameras wind and rewind film with an electric motor. Information relating to each photo frame is magnetically recorded on the film during film winding. A magnetic writing area 16 of the film is allocated that corresponds to a photo picture plane, i.e., exposure area, of each frame, as shown in FIG. 10. During film feeding, subsequent to taking a picture on each frame, a magnetic head 10 records photography information, e.g., information such as the photograph date or exposure values, on the magnetic writing area 16 corresponding to that photo frame.

In order to prevent the photo picture plane of each frame from shifting position with respect to each magnetic writing area 16, the position of each photo picture plane must be determined beforehand. Also, the photo picture plane determined at the shooting position, i.e., the position facing the aperture, must be positioned accurately. Consequently, two perforations 14 and 15 are provided at the same position on the photo picture plane of each frame of film, as shown in FIG. 10. A photo reflector or similar device detects the perforations during film feeding. The time to stop feeding the film is determined by counting the number of perforations which have been detected.

The film stops when the battery is removed during film winding. Installing a fresh battery restarts the film winding. However, depending on the position of the film when the winding stopped, it may be impossible to position accurately the photo picture plane at the shooting position on the basis of the count value of the perforations. The problem therefore arises that the position of all subsequent frames is shifted such that the perforations, frames and magnetic writing information does not correspond.

Additionally, the magnetic writing data is erased when the battery is removed during film winding. Magnetic writing data is recorded on the film when the film restarts after installation of a fresh battery. Thus, another problem arises that erroneous magnetic data is written during winding when a fresh battery is installed.

SUMMARY OF THE INVENTION

It is, therefore an object of the present invention to solve the problems identified above.

A film feed control apparatus in accordance with the invention has a feeding mechanism which feeds film via electric power. A predetermined number of perforations are provided at predetermined positions on each photo frame. The apparatus feeds the film and causes the film to stop at the predetermined positions.

The present invention includes an edge detector that detects edges of the perforations of the film as the film is fed in the feeding direction. A physical amount detector detects a physical amount that relates to an amount of film that is fed from a time when the film feeding starts to a time when an edge of a predetermined perforation is detected. The physical amount detector also detects a physical amount that relates to an amount of film that is fed from the time when the edge of the predetermined perforation is detected to a time when another edge is detected. A controller determines a time, subsequent to the time when film feeding starts, for the feeding mechanism to stop feeding the film based upon a number of edges detected by the edge detector and the physical amounts detected by the physical amount detector.

Thus, the present invention detects a physical amount that relates to an amount of film that is fed from a time when the film feeding starts to a time when an edge of a predetermined perforation is detected, and a physical amount that relates to an amount of film that is fed from the time when the edge of the predetermined perforation is detected to a time when another edge is detected. The time to stop film feeding is determined on the basis of the number of edges of perforations detected and the physical amounts detected.

The physical amount detecting mechanism can be a timing mechanism which times an interval from the start of the film feeding up to when the edge of a predetermined perforation is detected, and the interval when the edge of the perforation is detected up to when the next edge is detected.

Several perforations can be provided near the edge of each frame of film. The controller can include a time judging mechanism which determines whether the time detected as the physical amount is shorter than a predetermined time. The controller can also include a stop control unit which controls the feeding mechanism to stop the film when the time judging mechanism determines that the timing interval is shorter than the predetermined time for a predetermined number of times in a row.

The controller can also include an edge judging unit which judges whether the detected edge of the perforation is the edge on the leading or trailing side of the film. After film feeding starts, the stop control unit can control the feeding mechanism to stop the film when the judging mechanism judges, a predetermined number of times in a row, that the timing interval is shorter than the predetermined time, and when it has been determined that the last detected edge is an edge on the trailing side of the film.

The feeding mechanism can start film feeding when it detects that a power source has been supplied to it.

A non-volatile memory can be provided to store a feeding incomplete status. The feeding incomplete status indicates that the film has not been fed as far as a predetermined position after film feeding starts. Film feeding is started when it is detected that a power source has been supplied to the feeding mechanism and the feeding incomplete status is stored in memory.

A memory can be provided which, during film feeding, stores information on a memory area of each photo frame of the film. An inhibitor can also be provided to inhibit the recording of this information by the memory when the feeding incomplete status is stored in memory.

Further objects, details and advantages of the invention will be apparent from the following detailed description, when read in conjunction with the drawings.

DETAILED DESCRIPTION OF PREFERRED EMBODIMENTS

Figure 1:
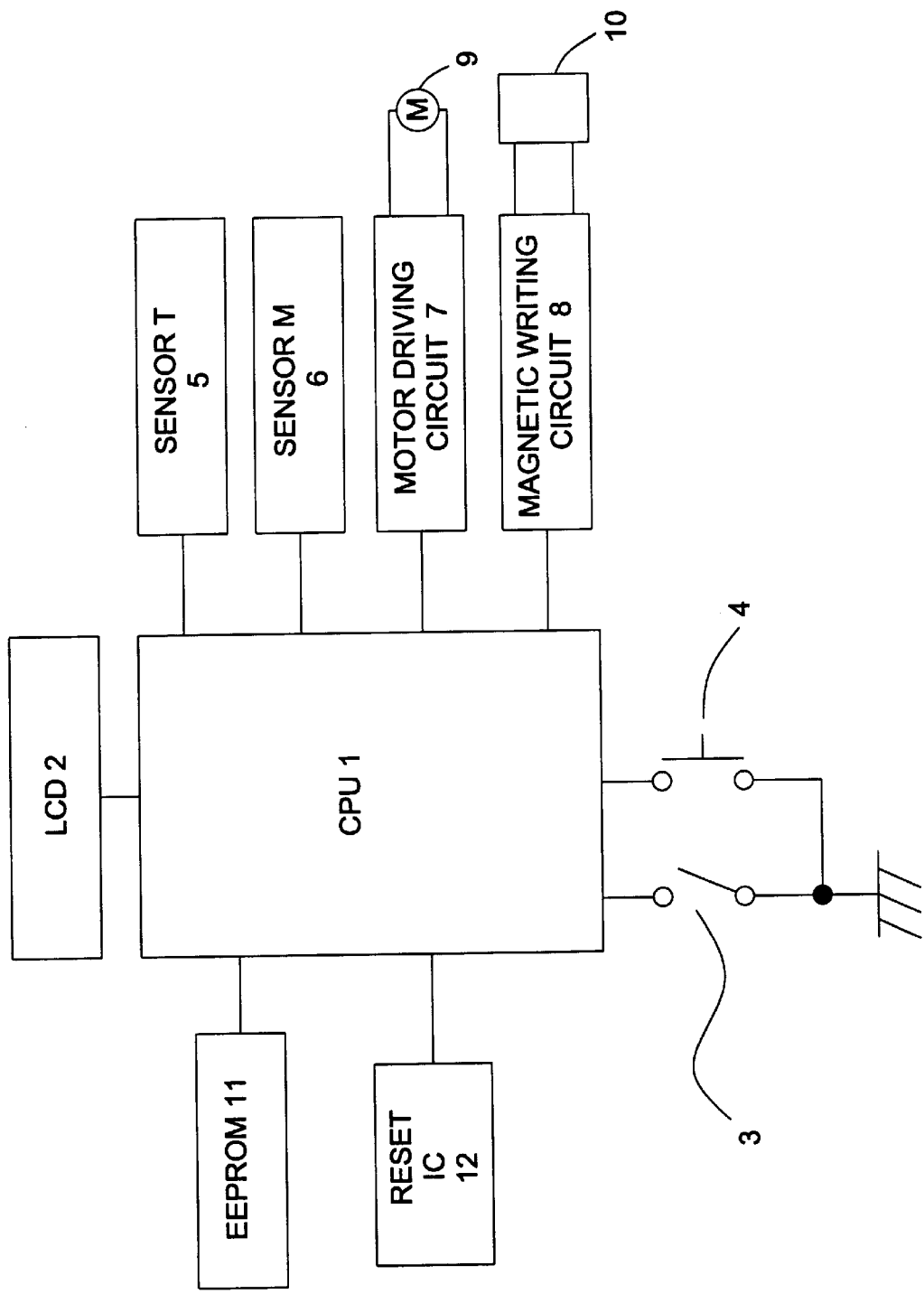
FIG. 1 is a block diagram showing a control system of a camera having a film feed control apparatus of an embodiment of the present invention.

FIG. 1 is a block diagram showing a control system of a camera. A CPU 1 includes a one-chip microcomputer. The CPU 1 has a counter and a timer or similar device. The CPU 1 controls all sequences of the camera. The process described below relates to programs installed in the CPU for film feeding.

A liquid crystal display device, i.e., an LCD 2 displays information such as a film count value. A cartridge cover switch 3 moves between on and off positions based upon the state of a cartridge cover. The cartridge cover opens and closes the cartridge loading opening of the cartridge chamber. A release switch 4 is actuated into an on position when a release button is depressed. The LCD 2, cartridge cover switch 3 and the release switch 4 are connected to the CPU 1.

The cartridge cover switch 3 is a status switch which has on and off positions. The cartridge cover switch is actuated into the on position when the cartridge cover is opened, and into the off position when the cartridge cover is closed. The release switch 4 is actuated into the on position when a user depresses a release button (not shown) to take a photograph. A photometry circuit, a range measuring circuit and a shutter driving circuit or similar device are driven, and a series of photography actions are conducted, when the release switch is actuated into the on position.

A motor driving circuit 7 drives the film feeding motor 9. A magnetic writing circuit 8 drives a magnetic head 10 that writes magnetic data on the film surface. Sensors T 5 and M 6 detect the movement of the film during film feeding. The motor driving circuit 7, magnetic writing circuit 8, and sensors T 5 and M 6 are all connected to the CPU 1. The motor driving circuit 7 drives the motor 9 with either forward rotation, reverse rotation or shorts the motor based upon signals from the CPU 1. The rotation of the motor 9 is transferred to a film cartridge and film winding spool (not shown) via a winding mechanism (not shown). Rotating the film cartridge and film winding spool feeds the film. Forward rotation of the motor 9 feeds the film in the direction of winding. Reverse rotation of the motor 9 feeds the film in the direction of rewinding. The movement of the film is stopped by shorting two terminals of the motor 9.

Figure 8:
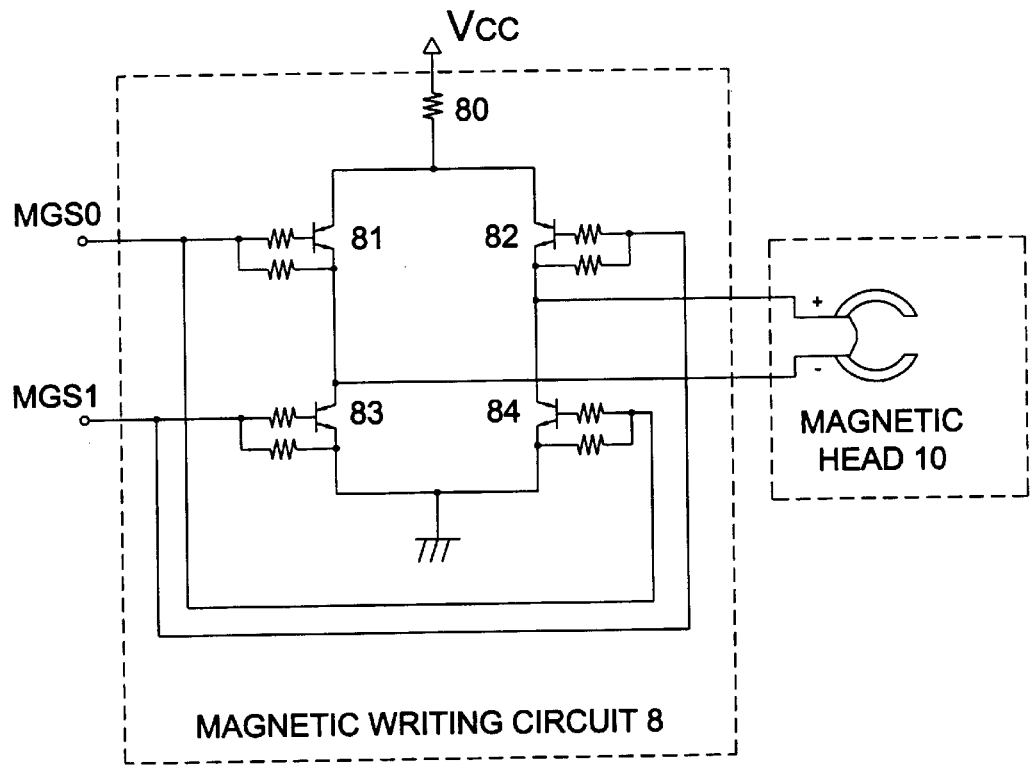
FIG. 8 is a circuit diagram showing a magnetic writing circuit.

The magnetic writing circuit 8 conducts electricity through the magnetic head 10 in either a forward direction or in a reverse direction based upon signals from the CPU 1. FIG. 8 shows a circuit diagram of the magnetic writing circuit 8. A resistor 80 controls the amount of current that flows to the magnetic head 10. Transistors 81–84 are controlled by signals MGS0 and MGS1 from the CPU 1. The relationship between MGS0 and MGS1 and the magnetic field created by the magnetic head 10 is shown in the following table.

TABLE 1

| MFS0 | MGS1 | electric current state |
|---|---|---|
| H | L | negative magnetic field |
| L | H | positive magnetic field |
| L | L | no electricity supplied |
| H | H | not used |

During magnetic writing, MGS0 and MGS1 are reversed alternately. The magnetic field created by the magnetic head 10 is switched alternately between a positive magnetic field and a negative magnetic field. Data is written onto the film surface by timing the switching of the magnetic field.

Figure 10:
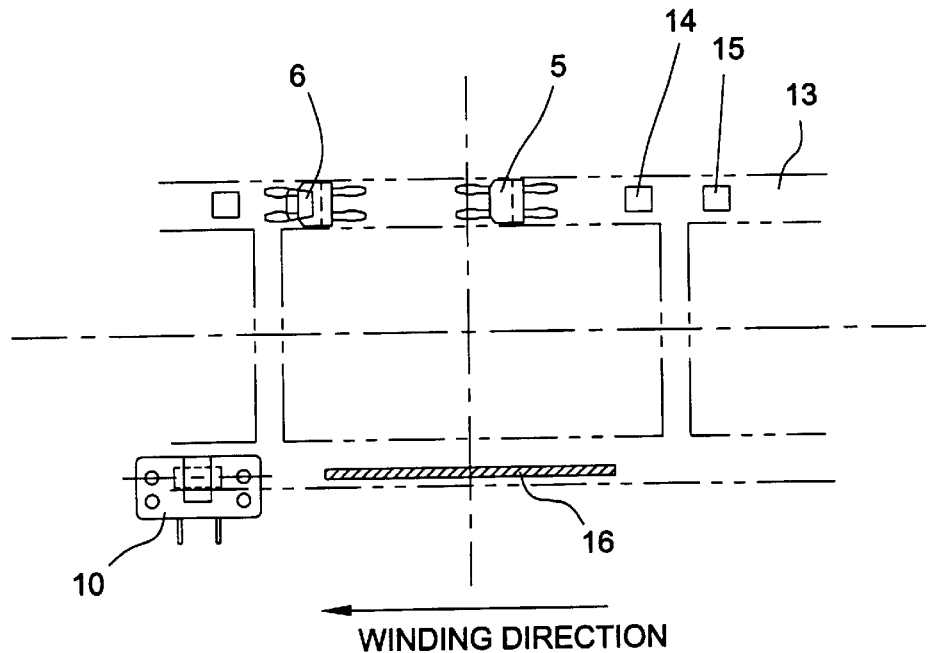
FIG. 10 is a sketch showing a positional relationship of perforation detection sensors and a magnetic head with respect to the film.

Sensors T 5 and M 6 each include photo-reflectors having light-emitting units. Sensors T 5 and M 6 are positioned so as to face the perforated areas of the film. Sensors T 5 and M 6 detect the position of the film by optically detecting the perforations of the film during film feeding, as shown in FIG. 10. A reflective plate having a higher reflectivity than the film is attached to the film rail surface. The reflective plate faces sensors T 5 and M 6 via the film 13.

The film 13 is wound around the winding spool. Illuminating light from the light-receiving units is reflected by the film and received by the light-receiving units when a perforation is not positioned between each of the sensors and the rail surface. However, when a perforation is positioned between the sensors and the rail surface, illuminating light from the light-emitting units passes through the perforations, is reflected by a reflecting member on the rail surface, and is received by the light-emitting unit. The amount of light received after being reflected by the film is less than a predetermined value. The amount of light received after being reflected by a reflecting member is at least as great as the predetermined value. Thus, it is possible to detect the absence or presence of a perforation from the output signals of the light-receiving units.

Figure 11:
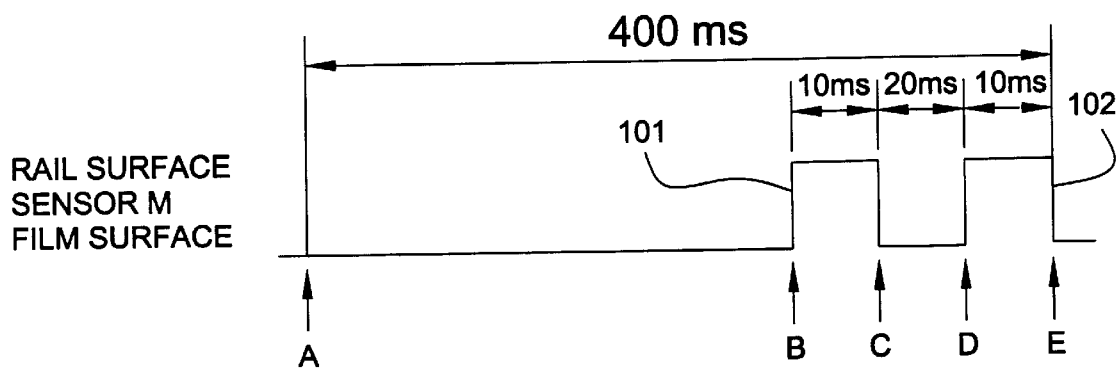
FIG. 11 is a time chart showing output signals of perforation detection sensors.

FIG. 11 shows an output signal from the light-receiving units. Output waveforms 101 and 102 correspond to the perforations 14 and 15.

An EEPROM 11 is connected to the CPU 1 as a non-volatile memory. A reset IC 12 is also connected to the CPU 1. Data used in the processes of the camera is stored in the EEPROM 11. A winding flag, which indicates whether the film is winding, and a film counter operate based on the data stored in the EEPROM 11. This data is stored in memory even when the battery power source is removed. The reset IC 12 resets the CPU when it detects that the battery has been removed and that the circuit power source voltage has fallen. The reset IC 12 releases the resetting of, and activates, the CPU 1 when a fresh battery is inserted and the power source voltage is restored.

As shown in FIG. 10, the overall position of the photo picture plane of each frame of film 13 is predetermined. Two perforations 14 and 15 are provided on the film corresponding to each photo picture plane. On the lower part of the film, a magnetic body is coated uniformly in its lengthwise direction, and a magnetic writing area 16 is allocated on each frame. The film cartridge (not shown) is disposed at the right side of FIG. 10.

The magnetic head 10 contacts the surface of the film 13. Magnetic data is written on the magnetic body of the film surface when the magnetic head creates positive and negative magnetic fields for a predetermined time during film feeding. The sensor T 5 and the magnetic head 10 are disposed such that when the edge shown at the right side of FIG. 10, i.e., the film trailing side of the perforation 14, reaches sensor T 5, the magnetic head 10 reaches the left edge, i.e., the writing start position of the magnetic writing area 16.

The sensor M 6 is also disposed such that when the edge on the right side of the perforation 15 reaches sensor M 6, the photo picture plane of each frame is set at the shooting position, i.e., the position facing the aperture.

A write lock door is provided in the film cartridge. The write lock door opens and closes in order to shield the film exit from light. Film information, such as the total number of frames of the film, the ISO sensitivity and similar data is recorded on a bar code disk. The film information is recorded by a black-and-white bar code pattern on the bar code disk. The information is read by a sensor such as a photo-reflector or similar device which reads the time between reversals of a signal while rotating the disk. The rotational position of the bar code disk is predetermined in the unused cartridge. The position, i.e., angle where the bar code disk stops when the cartridge is removed from the camera, is also determined. Thus, when loading a cartridge, it is possible to judge whether the film in the cartridge is unexposed or exposed, by using a predetermined sensor to read the rotational position of the bar code disk. A user can verify the rotational position of the bar code disk, i.e., whether the film is unexposed or exposed by using a display member which rotates integrally with the bar code disk.

Figure 2:
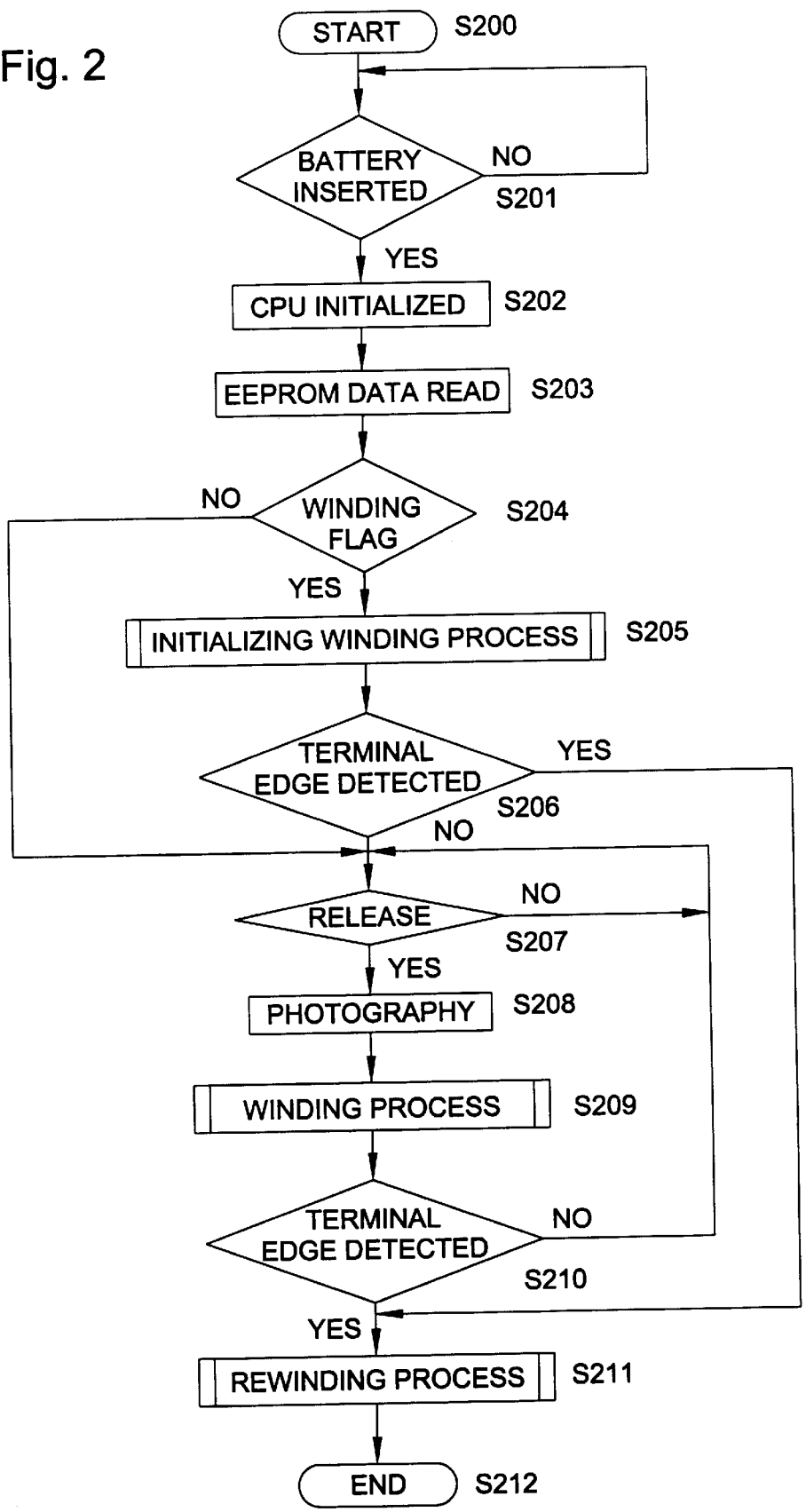
FIG. 2 is a principal flowchart showing operations of a camera.

FIGS. 2–7 are flowcharts that show the sequence of control by the CPU 1. FIG. 2 shows basic operations of the present embodiment, while FIGS. 3–7 show details of the sequence of the processes of FIG. 2. The above flowcharts assume that the film has already been loaded.

The process begins at step S200 of FIG. 2. In step S201, the output of the reset IC 12 is verified, and the program waits for a battery to be inserted. When a battery is inserted, the program moves to step S202, wherein the RAM and counter inside the CPU 1 and peripheral circuits (not shown) peripheral to the CPU 1 are initialized. In step S203, data is read from the EEPROM 11. A winding flag and a film counter value are included in the data that is read. In step S204, the winding flag that is read from the EEPROM 11 is determined. If the flag has not been set, the program waits for the release switch 4 to be actuated into the on position in step S207. If the flag has been set, the program advances to step S205 wherein an initializing winding process is executed. The initializing winding process is described below.

In step S206, the state of a terminal edge detection flag is determined, wherein a judgement is made as to whether the terminal edge detection has occurred during initial winding. When the determination in step S206 is affirmative, the film is rewound in step S211. When the determination is negative, a particular photo frame of the film is set in the shooting position, and the program waits for the release switch 4 to be actuated into the on position in step S207. When the release switch 4 is actuated into the on position, a shooting process is conducted in step S208. During the shooting process, the range to, and light from, the object are measured. Lens driving and a shutter release are conducted in accordance with these results. An electronic flash apparatus emits light as necessary.

When the shooting process has been completed, the program moves to step S209, and the winding process is initiated. The film is wound to the next frame and data is magnetically written onto the film. The film can be wound such that one frame is wound normally and the winding stops upon reaching the next frame. The film can also be wound such that the terminal edge of the film is reached during film winding and the process is concluded. When the winding process is concluded, the program advances to step S210. A determination is made as to whether the film terminal edge has been detected during the winding process. When the terminal edge has not been detected, the program returns to step S207 and repeats the above-described process. However, when the terminal edge has been detected, the program advances to step S211. In step S211, a rewinding process is initiated. The rewinding process is finished in step S212. The rewinding process is described below.

Figure 3:
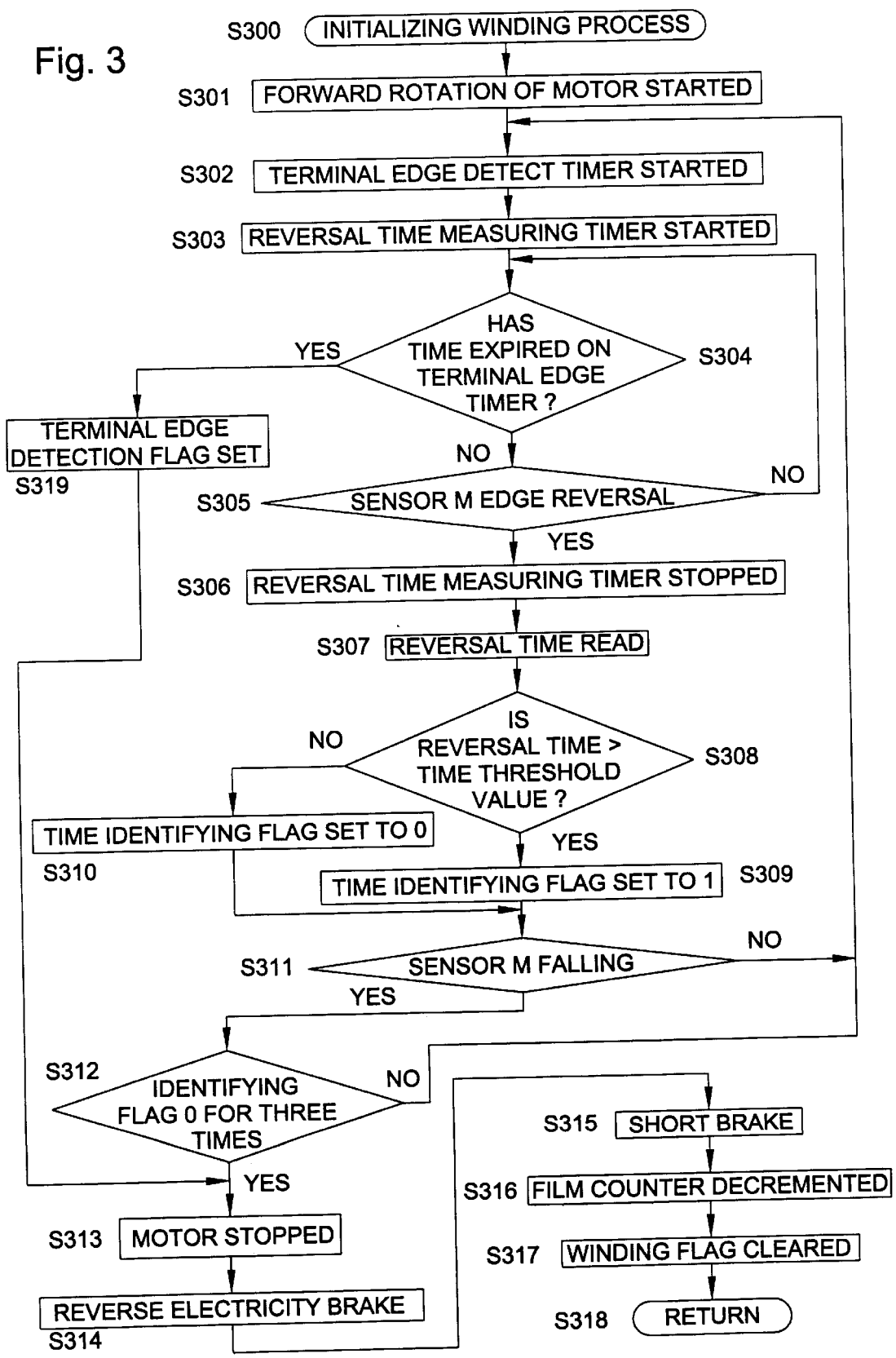
FIG. 3 is a flowchart showing an initial winding process.

FIG. 3 is a flowchart showing the initializing winding process of step S205. The initializing winding process is a process which supplies film until the photo frame to be exposed reaches the predetermined shooting position, i.e., the position facing the aperture.

The process begins at step S300. In step S301, the motor 9 is rotated forward to wind the film. In step S302, the film terminal edge detection timer is set to 2 seconds and started. In step S303, the reversal time measuring timer is cleared and started. The program begins a loop that includes steps S304 and S305. In step S304, it is determined whether the time has expired on the terminal edge detection timer, i.e., whether two seconds have elapsed from the start of winding. When the terminal edge has been detected, the program advances to step S319 and the terminal edge detection flag is set in the RAM of CPU 1. Following step S319, steps S313–S318 are executed as if winding had been completed normally. The program then returns to step S206 of FIG. 2.

In step S305, it is determined whether sensor M 6 has detected an edge of a perforation in the film feeding direction. A film leading-side edge and a film trailing-side edge exist for each perforation. The output signal of the sensor M 6 is read and compared with a threshold value that is used in signal level judging. If the output signal of the sensor M 6 is lower than the threshold value, it is determined that the sensor M6 is opposite the film surface. However, if the signal is higher than the threshold value, the sensor M6 is determined to be opposite the rail surface, i.e., a perforation is disposed at sensor M6. It is determined whether these judgement results have changed with respect to the judgement results of the previous step S305 that are stored in memory. When the results have not changed, it is determined that an edge of the perforation has not been detected and the program returns to step S304. However, if these results have changed, it is determined that an edge has been detected and the program advances to step S306.

In step S306, the reversal time measuring timer is stopped. In step S307, the reversal time is read. The reversal time is the time interval from detection of an edge reversal to the detection of the next reversal. In the case of the initial edge reversal time, the time is from the start of feeding to an edge reversal. In step S308, the reversal time detected in step S307 is compared to a time threshold value that is used to identify reversal times. The time threshold value is a constant which is set beforehand on the basis of the film feeding speed. The time threshold value is a time that is longer than the time needed to pass between two perforations, and shorter than the time needed, from the start of winding, to reach the first perforation during normal winding. The method of setting the time threshold value is described hereafter, but is assumed to be 150 ms in the following example.

If the reversal time is longer than the time threshold value, e.g. 150 ms, the program advances to step S309. The time identifying flag is set to 1. The setting of 1 indicates that the reversal time is "long." However, if the reversal time is shorter than the time threshold value, e.g. 150 ms, the program advances to step S310 and sets the time identifying flag to 0. The setting of 0 indicates that the reversal time is "short." The time identifying flag is used in the determination of step S312. However, the time identifying flag is not a one-bit flag, and instead is shifted successively each time the flag is set in steps S309 and S310 using a RAM of at least 3 bits. Thus, the states of at least the last three times are recorded, including the most recent state.

Following steps S309 and S310, the program advances to step S311. A determination is made as to whether the edge reversal of sensor M 6, which was detected in step S305, is a rise or a fall. In the case of a rise, the edge is one from the film surface to the rail surface, i.e., an edge on the film leading side, and the program returns to step S302. Consequently, when a leading-side edge is detected, the program returns to step S302 to wait for the next edge input. After the reversal time measuring timer has been stopped in step S306, the program returns to step S302 from step S311. Although several steps must be processed before restarting the reversal time measuring timer in step S303, the processes of the CPU 1 are extremely fast. The process time requires no longer than 100 μs, and thus no errors in measuring time are created.

In step S311, when it is determined that the edge reversal of the sensor M 6 is a fall, i.e., when the edge that has been detected is a trailing-side edge, the program advances to step S312. In step S312, three occurrences of the time identifying flag, starting from the most recent, are read. A determination is made as to whether the time identifying flag has been set to "0" for three times. This process determines which of the perforations 14 and 15 the detected trailing-side edge belongs to, for reasons discussed below. When the determination in step S312 is negative, film feeding is continued and the program returns to step S302. The program returns to step S302 when the identifying flag has not yet been set three times.

When the identifying flag has been set at least three times and when the three most recent values are all "0", the program advances to step S313 to stop film feeding and the motor 9 is stopped. Subsequently, in step S314, a reverse electric brake is applied by driving the motor 9 in reverse for a predetermined time, e.g., approximately 5 ms. The motor 9 is shorted by applying a short brake for a predetermined time, e.g., approximately 80 ms, in step S315. This process stops the feeding of the film with the predetermined photo frame of the film facing the aperture. Thus, film feeding is stopped when the trailing-side edge of the perforation 15, as shown in FIG. 10, is detected.

After the film is stopped, the frame number of the film is displayed on the film counter of the LCD 2 in step S316. The frame number read from the EEPROM 11 in step S203 is decremented by 1. In step S317, the winding flag is cleared and the program returns to the processes of FIG. 2.

The above-described initializing winding process is described specifically via FIG. 11.

FIG. 11 shows an output waveform from the sensor M 6. A corresponds to the winding start timing. B and C correspond to the detection timing of the leading-side edge and the trailing-side edge of the perforation 14 respectively. D and E correspond to the detection timing of the leading-side and the trailing-side edges of the perforation 15 respectively. E corresponds to the winding complete time. The winding time, i.e., the time between A and E, of one frame is approximately 400 ms. The time for the perforations to pass, i.e., the time between B and C and between D and E, is approximately 10 ms. The time between perforations, i.e., the time between C and D, is approximately 20 ms. Each of these times is an actually measured value under standard conditions. Variances in each of the time values is estimated to be double these values at most.

The time threshold value used in the determination of step S308 is used to determine the film feeding start position. The time threshold value is sufficiently longer than the maximum value, i.e., wherein the film feeding speed is assumed to be the slowest, of the time between C and D, and is sufficiently shorter than the minimum value, i.e., wherein the film feeding speed is assumed to be the fastest, of the time between A and B. By taking into consideration the fact that the feeding speed varies by a factor of two, the time threshold value T is set in a range as follows:

(20 ms×2)<T<(400 ms−10 ms−20 ms−10 ms)/2, which is, 40 ms<T<180 ms.

Here, the value is assumed to be 150 ms.

The following is a description of the situation wherein feeding is started between A and B, i.e., wherein the battery is removed once between A and B and subsequently reinserted. When the feeding time from the start of feeding to point B exceeds the 150 ms threshold value, the time identifying flag is set at the time of B in step S309. Because the sensor M is falling, i.e., trailing-side edge detection, at point C, the identifying flags of three times are judged in step S312. Because the time identifying flag value of "0" does not persist for three times yet, the program returns to step S302 and feeding continues. Because the time between C and D is not greater than 150 ms, the time identifying flag is set to 0 at the timing of D. Furthermore, because the time between D and E is also not greater than 150 ms, the time identifying flag is set to 0 at point E. Because the output of the sensor M 6 is falling at E, the identifying flag is judged at step S312. Because the identifying flag is set to 0 at C, D, and E, it is determined that this is a stop position. Film feeding is therefore stopped. Thus, after the time between A and B is detected to be "long", "short" is detected for three times, and because the third "short" is falling, this is determined to be the feeding stop time E.

However, when feeding is started immediately prior to B, the time from the start of feeding to B is less than 150 ms. Because the identifying flag is set to 0 at B, it is detected D that the identifying flag is "0" for three times. However, because the output of the sensor M 6 is rising, i.e., leading-side edge detection, at D, the film continues to be fed. Subsequently, film feeding is stopped when E is reached as described above.

When feeding is started between B and C, the identifying flag is set to 0 at C, D and E. Consequently, film feeding is stopped at E. When feeding is started between C and E, the identifying flag does not remain 0 for three times at E. Thus, E is not determined to be the feeding stop time and feeding continues. The time between A and B of the next frame is at least 150 ms. Consequently, the identifying flag is set to 1 at B. The identifying flag is judged at the next fall of C. However, feeding continues because the identifying flag does not remain 0 for three times. Furthermore, the fact that the identifying flag is 0 for three times at the fall of E is detected, and the film is stopped.

A time longer than the standard value shown in FIG. 11 may elapse, depending on the rise time from the start of feeding to when the rotation of the motor 9 becomes stable. Consequently, a reversal time, which should be determined to be "short" when the motor is always rotating at a stable speed, may be determined to be "long". For example, when feeding starts between B and C, the time between B and C may be determined to be "long". Thus, E of this frame cannot be determined to be the feeding stop time. However, if feeding continues to the next frame, E of the next frame can be determined to be the feeding stop time. Consequently, the film can be stopped in the same manner as when feeding is started between C and E.

In the initial winding process above, E can be detected as the feeding stop time regardless of where film feeding starts. Specifically, when feeding starts near E, even though the first E is not detected as the feeding stop time, the feeding continues and E of the next frame is detected as the feeding stop time. Accordingly, the film is stopped with a photo frame positioned accurately at the shooting position in all cases.

Figure 4:
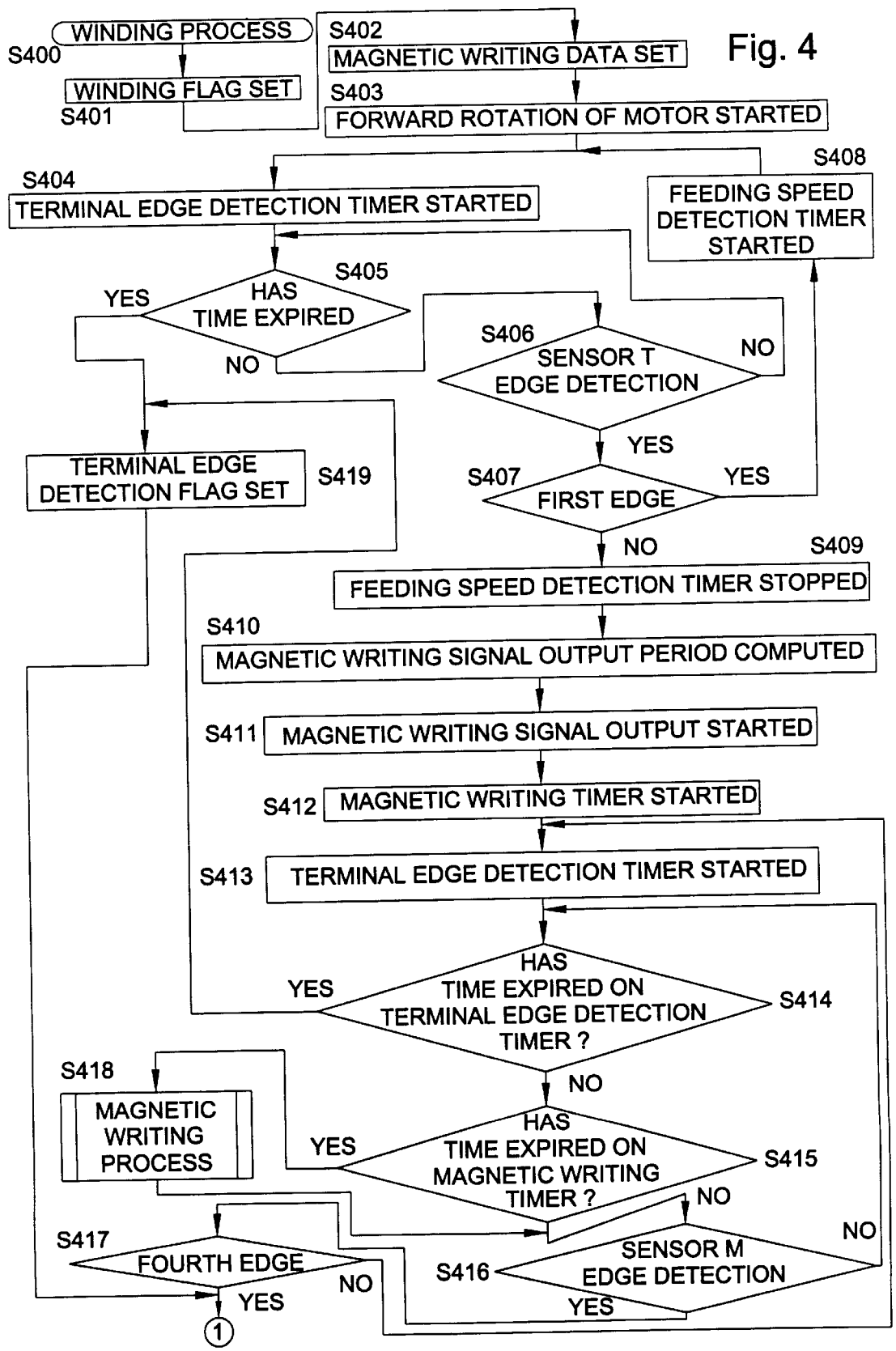
FIG. 4 is a flowchart showing a winding process.
Figure 5:
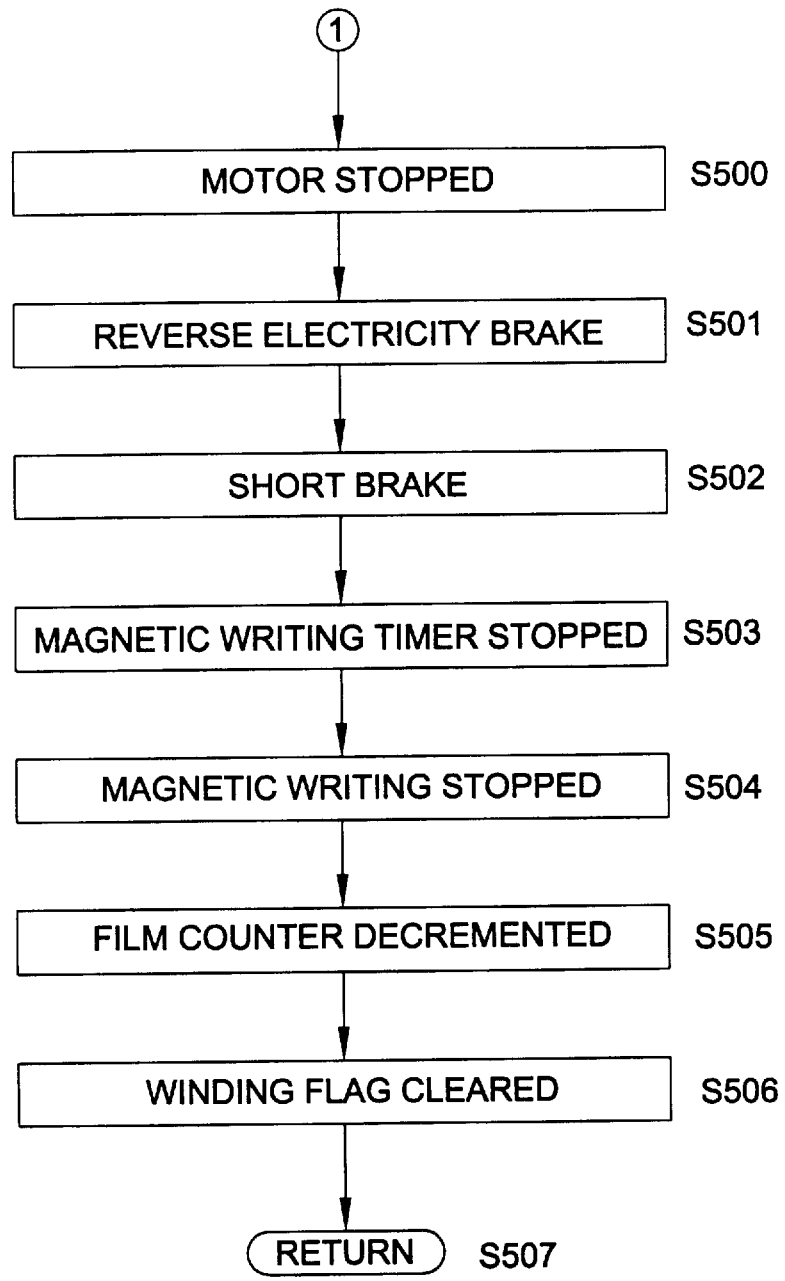
FIG. 5 is a flowchart that is a continuation of the flowchart of FIG. 4.

FIGS. 4 and 5 are flowcharts showing the winding process. The winding process is a process wherein the film is wound by one frame after one frame is shot. The next frame is moved to the shooting position. Magnetic data is written onto the magnetic writing area 16 of the frame as one frame is wound. The film feeding speed is stable before the sensor T 5 detects the first edge. It is assumed that the film speed does not vary subsequent to detection of the first edge.

Step S400 is initiated when photography of one frame has been completed and the winding process of FIG. 4 begins. In step S401, the winding flag is set in the EEPROM 11. In step S402, the data to be written during the magnetic writing process is processed into magnetic data. The data is written into a predetermined area of the RAM and sequentially lined up. The data includes information relating to the date and time of photography, information concerning whether to print this information on the photograph print, information concerning whether an electronic flash apparatus was used, brightness information, information stipulating print size and similar data. Furthermore, data stipulating the start and end of magnetic writing, data indicating the version of the specifications of the film 13, a check sum and similar information are also written.

This data is converted into a code of "0" and "1" based on the specifications. The data is stored so as to be readily accessible at the time of writing during feeding. The number of writing bits differs depending on the amount of data, but is approximately 300 to 500 bits. For example, 376 bits, i.e., 47 bytes, can be written. The data to be written is set at step S402. Consequently, even if data changes after step S402 but prior to magnetic writing, such as time and date information, the effects are not received. The writing density of the magnetic data is assumed to be 25 bits written while 1 mm of film is fed. In 33% of cases, the position, i.e., bit position, of the data during one period is "0". In 67% of the cases, the position is "1". The program advances to step S403 after the data to be written is set in the RAM.

In step S403, the motor 9 starts to rotate forward and the film is fed in the direction of winding. In step S404, the terminal edge detection timer, which detects the terminal edge of the film, is set to two seconds and started. The signal MGS1 described above is set to "H". A positive magnetic field is output from the magnetic head 10 to prepare for the magnetic writing process. The program enters a loop that includes steps S405 and S406. In step S405, when the time expires on the terminal edge detection timer, it is determined that the film terminal edge has been reached, and the program advances to step S419.

In step S406, a determination is made as to whether the edge of a perforation has been detected. The input signal from the sensor T 5 is read. The input signal is compared to the threshold value used in signal level judging. If the input voltage is lower than the threshold value, it is determined that the sensor T 5 is facing the film surface. However, when the input voltage is higher than the threshold value, it is determined that the sensor T 5 is facing the rail surface via a perforation. The results of this judgment and the results of the judgment of the previous writing which are stored in memory are compared. A determination is made as to whether the results have changed. When the results have not changed, it is determined that an edge is not detected and the program returns to step S405. However, when the results have changed, it is determined that an edge has been detected and the program advances to step S407.

Upon advancing to step S407 for the first time, the edge detected is the leading-side edge of a perforation 14, and the program advances to step S408. In step S408, the timer for detecting the feeding speed is cleared and started. The program returns to step S404. In the following explanation, the leading-side edge and the trailing-side edge of the perforation 14 are referred to as the first and second edges respectively, and the leading-side edge and the trailing-side edge of the perforation 15 are referred to as the third and fourth edges respectively.

When the program advances to step S409, the feeding speed detection timer is started when the edge that has been detected is not the first edge. The time from when the first edge is detected to when the second edge is detected, i.e., the time it takes for the film to be fed in the amount of one perforation, (hereinafter Tp) is stored in the feeding speed detection timer. In step S410, the output period of the magnetic writing signal is computed based on Tp. When 25 bits of magnetic data are written while the film is fed 1 mm, and the width of the perforation 14 is 2 mm, the writing time Tw for one bit is as follows:

$$Tw=Tp/(2\times 25).$$

T1 is determined as follows:

$$T1=Tw\times 0.33.$$

T1 is stored in RAM in order to make the magnetic writing process easy.

The magnetic writing signal starts to be output in step S411. At the start of winding, MGS0 is set to L and MGS1 is set to H. However these values are simultaneously reversed. This becomes the clock output of the first bit of data. In step S412, the magnetic writing timer is started. The magnetic writing timer is a timer that is used to measure the reversal timing of the magnetic writing signals MGS0 and MGS1. MGS0 and MGS1 reverse when the time expires on this timer. In step S412, a value is set on the magnetic writing timer in order to specify the reversal timing of the first bit of data. When the first bit of data is "0", T1 is set on the magnetic writing timer. When the first bit of data is "1", T1×2+revision is set on the magnetic writing timer.

In step S413, two seconds is set on the terminal edge detection timer. The terminal edge detection timer is then restarted. The program enters a loop that includes steps S414, S415 and S416. As shown in FIG. 10, the amount of film fed from when the sensor T 5 detects the second edge to when the sensor M 6 detects the first edge is equal to at least half of the feeding amount of one frame. Accordingly, under normal conditions, the magnetic writing in step S418 is repeated. The reversal of the edge of the sensor M 6 is started before or after the time when the magnetic writing in step S418 is substantially completed. Furthermore, the magnetic writing of a predetermined number of bits of the magnetic writing process is completed prior to the detection of the fourth edge by the sensor M 6. In step S417, the fourth edge is detected by the sensor M 6 and the program advances to step S500.

It is determined that the film terminal edge has been reached and the program advances to step S419 when the time expires on the terminal edge detection timer in step S414. When the time expires on the magnetic writing timer in step S415, the program advances to step S418 and initiates the magnetic writing process of FIG. 7. The magnetic writing process is described as follows. However, MGS0 and MGS1 are reversed simultaneously and the magnetic field created by the magnetic head 10 in step S418 reverses. Subsequently, the program returns to the loop from step S414 to S416.

In step S416, it is determined whether the sensor M 6 has detected the edge of a perforation. The method of this determination is the same as that for the sensor T 5 explained above in step S406. When an edge is not detected, the program returns to step S414. However, when an edge has been detected, the program advances to step S417. In step S417, a determination is made as to whether the edge that has been detected is the fourth edge. When the detected edge is not the fourth edge, the program returns to step S413. However, when the detected edge is the fourth edge, the program advances to the film stop process of step S500. The determination of whether the detected edge is the fourth edge is accomplished by incrementing the counter value of a predetermined edge counter by 1 each time an edge is detected, and determining whether the count value is 4.

In step S500, the motor 9 is stopped. In step S501, a reverse electricity brake is applied by reversing the motor 9 for a predetermined time, e.g., approximately 5 ms. In step S502, a short brake is applied by shorting the motor 9 for a predetermined time, e.g., approximately 80 ms. This procedure completely stops the film, with the next frame of the film facing the aperture plane of the camera.

In step S503, the magnetic writing timer is stopped. Normally, magnetic writing of a predetermined bit is completed prior to advancing to step S500, and the magnetic writing timer is stopped in step S712 of FIG. 7. However, the stop process of the magnetic writing timer is initiated to handle erroneous actions such as fluctuations in the feeding speed. In step S504, both the MGS0 and the MGS1 are set to L, and the magnetic writing is stopped. In step S505, the film counter of the LCD 2 is decremented by 1 and displayed. In step S506, the winding flag of the EEPROM 11 is cleared, and the program returns from step S507 to the processes shown in FIG. 2.

However, when the program advances to step S419 from steps S405 and S414, a terminal edge detection flag is set in the RAM of the CPU 1. This flag is an identifying flag indicating that the film terminal edge has been detected during the winding process. The determination in step S210 described above is accomplished using this flag. Following step S419, the processes from step S500-step S506 are conducted the same as when the winding process is concluded normally.

The magnetic writing process is described below.

Figure 7:
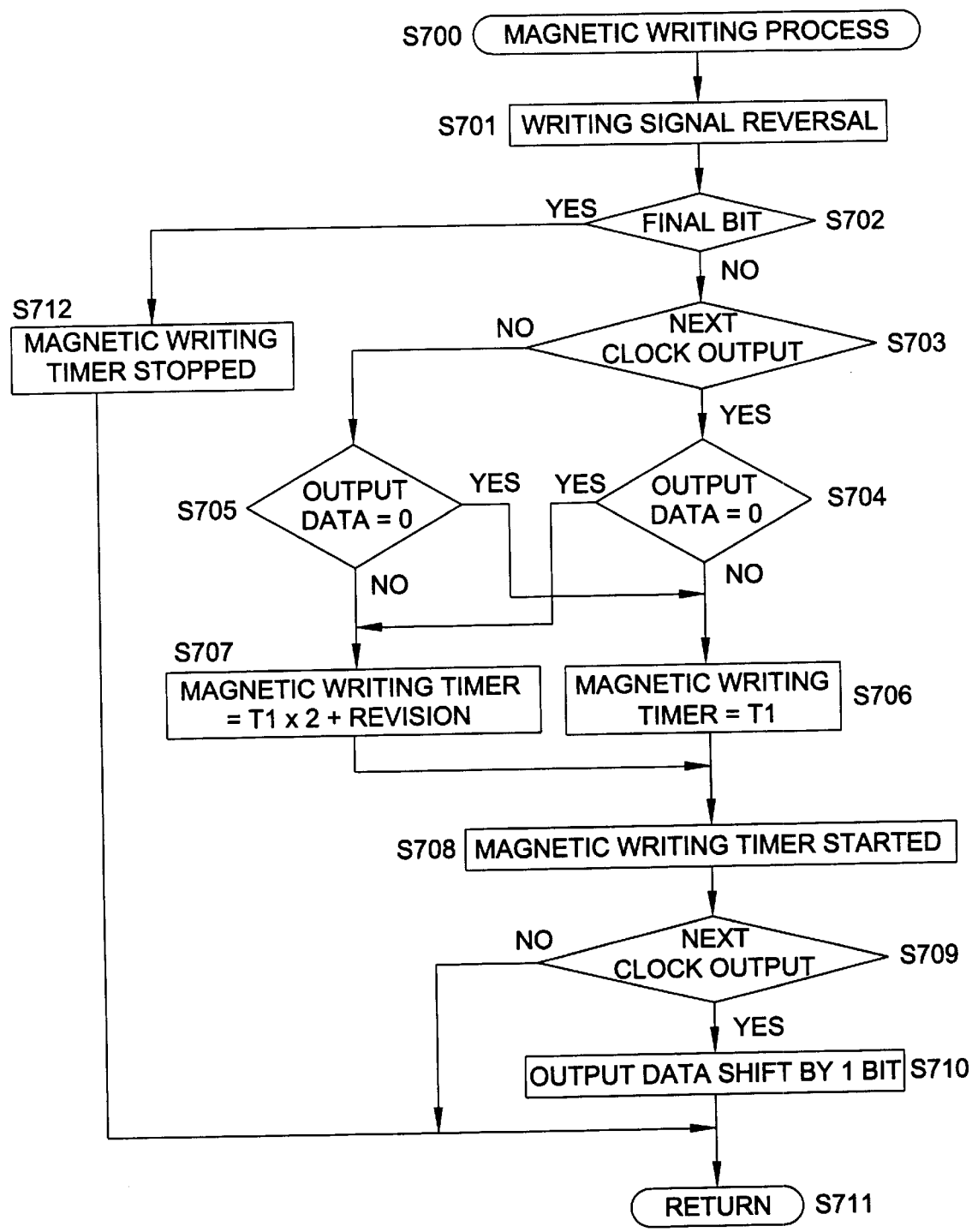
FIG. 7 is a flowchart showing a magnetic writing process.
Figure 9:
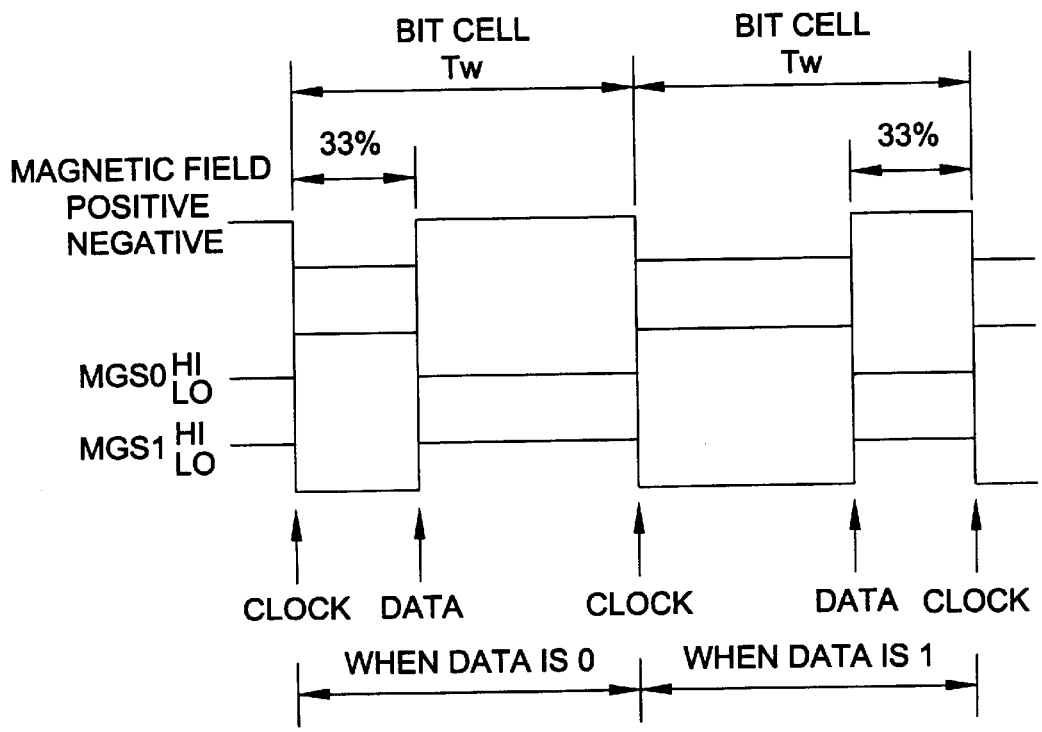
FIG. 9 is a time chart showing a signal waveform of each part of magnetic writing.

FIG. 9 shows the signal waveform output in the magnetic writing process. In the following description, the timing with which the magnetic field switches from positive to negative magnetism is referred to as the clock, and the timing with which the magnetic field switches from negative to positive magnetism is referred to as the data. The clock is always output at equal intervals. Using this clock interval as a criterion, when the writing data is "0", the magnetic field reverses, i.e., data is output, with a timing that is 33% of the clock signal following the clock output. When the writing data is "1", the magnetic field reverses, i.e., data is output, with a timing that is 67% of the clock interval following the clock output. FIG. 7 shows this process in detail.

When the time expires on the magnetic writing timer that was started in step S708, i.e., step S412 for the initial time, at the previous reversal of MGS0 and MGS1, step S700 is initiated and the magnetic writing process starts. In step S701, the writing signals MGS0 and MGS1 are reversed simultaneously. In step S702, a determination is made as to whether the data bit which is output this time is the final bit. When this data bit is the final bit, the program advances to step S712, the magnetic writing timer is stopped and the program returns to the processes in FIG. 4 from step S711. Stopping the magnetic writing timer prevents the magnetic writing process from being executed during the winding process of the following photo frame.

However, when it is determined in step S702 that this data bit is not the final bit, the processes in steps S703–S707 are performed and the counter time to the next expiration of time on the magnetic writing timer is set. The time is set according to the following table.

TABLE 2

| Next output edge | data | magnetic writing timer set time |
|---|---|---|
| next clock output | 0 | T1 |
|  | 1 | T1 × 2 + revision |
| next data output | 0 | T1 × 2 + revision |
|  | 1 | T1 |

T1 corresponds to the time of 33% of the writing period. When the next output edge is a clock output and the data is "0", a time of 33% is set. Consequently, T1 is set without any change. When the next output edge is a clock output and the data is "1", a time of 67% is set on the timer. This setting is computed by finding the time of 66% from T1×2 and adding a revision of 1%. The magnetic writing timer is set in accordance with the above table even when the next output edge is a data output. Subsequently, the program advances to step S708.

In step S708, the magnetic writing timer is started. In step S709, a determination is made as to whether the next output edge is a clock output. When the next output is not a clock output, the program returns from step S711 to a loop from steps S414–S416 as shown in FIG. 4. If the next output is a clock output, the program advances to step S710, and the output data is shifted by 1 bit. This procedure sets the output data for the next magnetic writing time. Subsequently, the program returns to a loop from steps S414–S416.

The above explanation provides the details of the winding and magnetic writing processes. The winding flag set in the EEPROM 11 in step S401 is cleared in step S506 when either winding is completed or the terminal edge is detected and winding has stopped. Consequently, when the battery is removed during winding, it is possible to identify whether winding was underway by determining in step S204 the data which was read in step S203 when the battery was reinserted.

Figure 6:
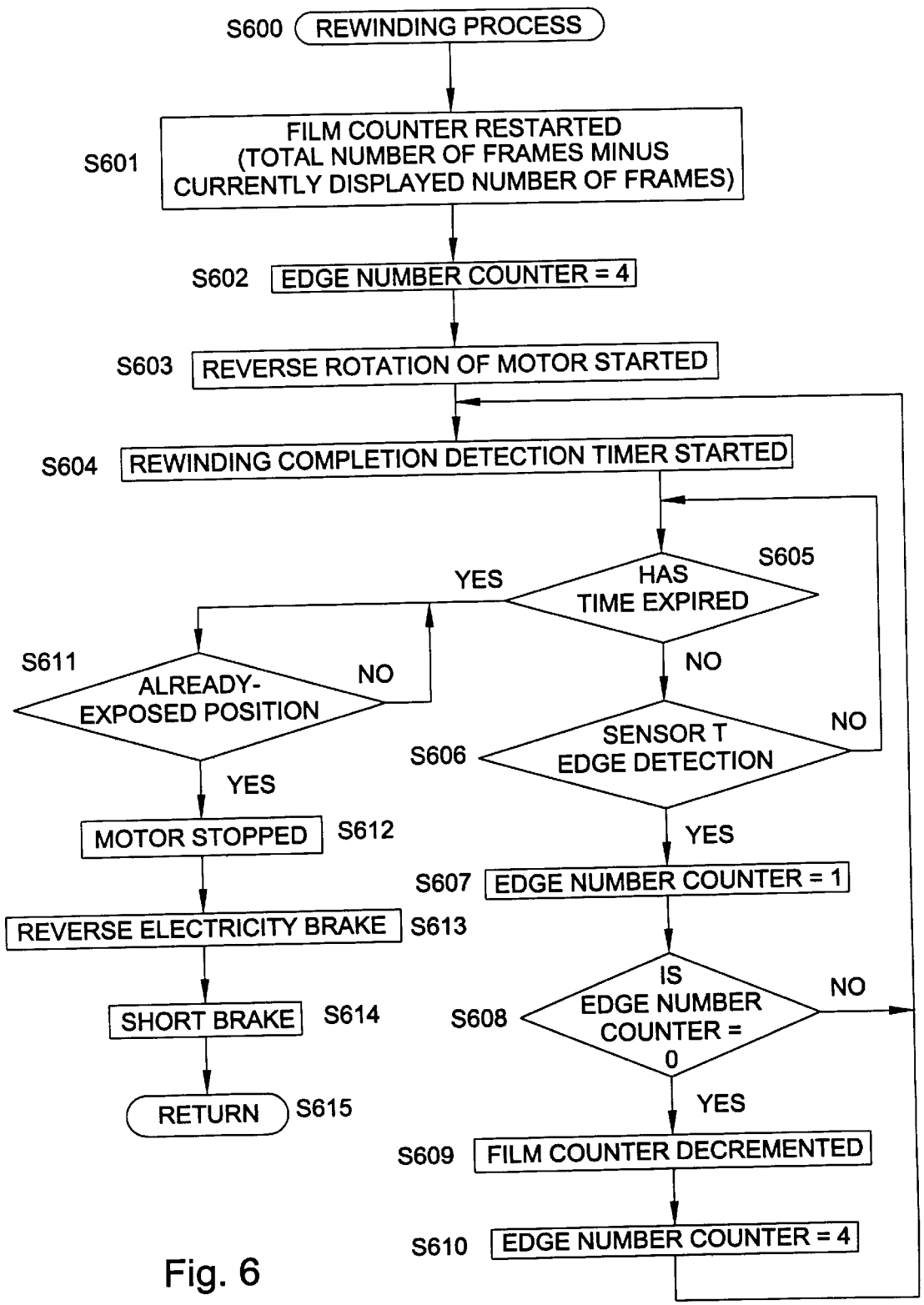
FIG. 6 is a flowchart showing a rewinding process.

FIG. 6 shows the rewinding process. The rewinding process is initiated when either the film terminal edge is detected in the winding process or when a feeding error is detected during film feeding. The sensor T 5 detects the amount of film that is rewound during rewinding. Detecting the amount of film that is rewound is conducted similarly by the sensor M 6. However, as shown in FIG. 10, sensor T 5 is closer to the cartridge. Also, using sensor T 5 increases the reliability of the rewinding process because the film leading edge passes into the cartridge after the film 13 is largely rewound.

The rewinding process starts at step S600. In step S601, the film counter display of the LCD 2 is reset. The value, corresponding to the number of frames which have already been shot, calculated by subtracting the film counter display at the time when rewinding starts from the total number of film frames read when the film is loaded, is displayed on the film counter. In step S602, the edge counter is set to "4" in order to count the number of reversals of edges of the sensor T 5. In step S603, reverse rotation of the motor 9 starts. In step S604, a preset time, e.g., 8 seconds, is set on the rewinding completion detection timer and the timer is started. This process starts the rewinding of the film.

The program moves to a loop that includes steps S605 and S606. In step S606, the signal of sensor T 5 is read. The method of reading the signal is the same as step S406 of the winding process. When a reversal of the edge is detected in step S606, the program advances to step S607 and the edge number counter is decremented by 1. In step S608, the determination is made as to whether the edge number counter is 0. When the edge number counter is not 0, the program returns to step S604, and the rewinding completion timer is set to 8 seconds and restarted. When the edge number counter is determined to be 0 in step S608, it is determined that the film has been rewound by one frame. Thus, in step S609, the film counter display of the LCD 2 is decremented by 1. In step S610, the edge number counter is reset to 4. Subsequently, the program returns to step S604.

The rewinding progresses and sensor T 5 stops detecting edge reversals after the leading edge of the film has passed the sensor T 5. When an edge reversal is not detected within 8 seconds, the time expires on the rewinding completion detection timer, and the program moves from step S605 to step S611. In step S611, the position of the bar code disk is detected by a sensor (not shown). The program then waits for the bar code disk to reach the already-exposed position. Subsequently, the motor 9 is stopped in step S612. In step S613, a reverse electricity brake is applied by the forward rotation of the motor 9 for a predetermined time, e.g., approximately 5 ms. In step S614, a short brake is applied by shorting the motor 9 for a predetermined time, e.g., approximately 80 ms. This process stops the rewinding of the film. The bar code disk stops at the already-exposed position, and the user can verify that the film has been exposed.

In the structure of the embodiment described above, the film feeding motor 9 and the motor driving circuit 7 function as a feeding mechanism. The sensors T 5 and M 6 function as edge detectors. The CPU 1 functions as a physical amount detector, a timing mechanism, a controller, and an inhibitor. An EEPROM 11 functions as a memory. A magnetic head 10 and magnetic writing circuit 8 function as a recording mechanism.

Figure 12:
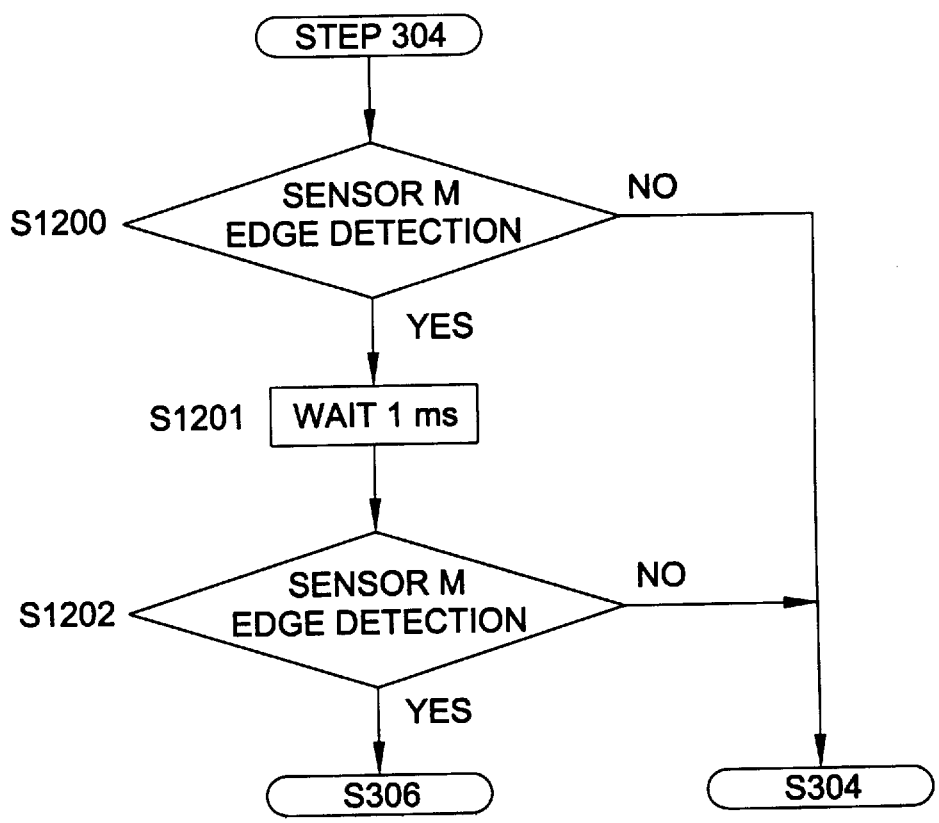
FIG. 12 is a flowchart showing a sequence of processes in accordance with another embodiment of the present invention.

In the above description, the signal reversals of the sensors M 6 and T 5 are determined once in each timing. However, signal noise can also be removed by conducting reverification by reading the same signal two or more times utilizing conventional signal noise removal methods. FIG. 12 shows a signal noise removal method.

FIG. 12 shows an alternative process to step S305 of FIG. 3. The program advances to step S1200 after step S304 of FIG. 3. In step S1200, a determination is made as to whether an edge has been detected through reversal of the signal of sensor M 6. When an edge has not been detected, the program returns to step S304. However, when an edge has been detected, the program advances to step S1201. In step S1201, the program waits for 1 ms. After 1 ms, a determination is again made in step S1202 as to whether an edge has been detected by sensor M 6. If an edge has not been detected, the program returns to step S304. However, when an edge has been detected, the program advances to step S306. The edge detection of the sensors T 5 and M 6 at other timings and the reading of other switches are conducted similarly.

In the above description, a reflective plate is attached to the rail surface in order to detect perforations via sensors T 5 and M 6. The reflectivity of the rail surface is greater than the reflectivity of the film surface. However, the relative reflectivities can be juxtaposed. Thus, the rail surface can be a non-reflective surface and the film surface can have a higher reflectivity. Two perforation detection sensors, T 5 and M 6, are used. However, one of the sensors, T 5, is used primarily to conduct magnetic writing accurately. Thus, only one perforation detection sensor can be used in cameras that do not have a magnetic writing function. Photo-reflectors are used as the perforation detection sensors. However, transparent-type photo-interrupters or similar devices can also be used. The time setting of the timers and the magnetic writing properties are not limited to the processes described above. The on/off timing of the power source is not described specifically in the above description. However, power via the power source preferably only is supplied to the sensors T 5 and M 6 during film feeding.

Furthermore, the time from when film feeding starts to when an edge of a predetermined perforation is detected, and the time from when the edge of the perforation is detected to when the next edge is detected are characterized as physical amounts relating to the film feeding amount during the interval. However, the film feeding amount itself may be detected instead of the times. In addition, the present invention may be applied to both normal wind cameras in which exposures are conducted from the leading edge side of the film to the trailing edge side, and to prewind cameras in which exposures are conducted from the trailing edge side of the film to the leading edge side. The present invention can also be applied to apparatus other than cameras that use film. For example, the present invention can be applied to apparatus which project picture image information of each frame of the film onto a TV screen, and to developing equipment. It would also be possible to stop the film at the correct position when the power source is cut during film feeding and the power source is supplied again.

With the present invention, the physical amounts relating to the film feeding amounts from when the film feeding starts to when an edge of a predetermined perforation is detected, and from when the edge of the perforation is detected to when the next edge is detected, and the number of times edges of the perforations are detected, are all used as the basis to determine when to stop the film feeding. Consequently, even if the power source to the feeding mechanism is cut during film feeding, it is possible to resume film feeding and stop the film in the correct position when the power source is again supplied.

The apparatus can be made so that after film feeding starts, a feeding incomplete status indicating that the film has not yet been fed as far as a predetermined position is stored in memory. Film feeding can be started when the fact that a power source has been supplied to the feeding mechanism is detected while the feeding incomplete status information is stored in memory. It is thus possible to feed the film only when the power source has been cut during feeding and then resupplied. It is therefore possible to prevent the film from being fed when film feeding is unnecessary. Information can be recorded during film feeding on the recording area of each shooting frame that is provided in the film. Thus, if information recording is prohibited when a feeding incomplete status is stored in memory, it is possible to prevent erroneous recording of information caused by the power source being cut.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A film feed control apparatus for feeding film in a film feeding direction and stopping the film at predetermined stopping positions, the apparatus having an electrical feeding mechanism for feeding the film, the film including a plurality of photo frames with each photo frame associated with one stopping position and at least one perforation having a pair of facially opposing edges extending perpendicularly to the film feeding direction, the film feed control apparatus comprising:

an edge detector that detects the edges of the perforations of the film as the film is fed in the film feeding direction;

a film advancement detector that detects a first amount of film that is fed from a time when the film feeding starts to a time when a first edge of the at least one perforation is detected by the edge detector, and a second amount of film that is fed from the time when the first edge of the at least one perforation is detected to a time when a last remaining edge of the at least one perforation is detected by the edge detector; and a controller that, subsequent to the time when film feeding starts, determines a film feeding start position based upon whether a threshold amount of time has been exceeded for the film advancement detector to detect the first amount of film and a time for the feeding mechanism to stop feeding the film at the one stopping position associated with a respective one of the plurality of photo frames based upon a total number of edges detected by the edge detector and the film feeding start position.

2. A film feed control apparatus according to claim 1, wherein the film advancement detector is a timing mechanism that measures a time interval that extends from the time when the film feeding starts to the time when the first edge of the at least one perforation is detected, and measures a time interval that extends from the time when the first edge of the at least one perforation is detected to the time when the last remaining edge is detected.

3. A film feed control apparatus according to claim 2, wherein multiple perforations are defined at an edge portion of each photo frame of the film, and the controller includes a time judging mechanism that judges whether the time intervals measured by the timing mechanism are less than a predetermined time interval, and a stop control unit that controls the feeding mechanism to stop the film when the judging mechanism judges that the time intervals are shorter than the predetermined time interval for a predetermined number of times.

4. A film feed control apparatus according to claim 3, wherein the controller includes an edge judging unit that judges whether an edge detected by the edge detector is on a leading or trailing side of the film, and subsequent to the time when film feeding starts, the stop control unit controls the feeding mechanism to stop the film when the judging mechanism judges that the time intervals are shorter than the predetermined time interval for a predetermined number of consecutive times and when the edge judging unit judges that a last edge detected was on the trailing side of the film.

5. A film feed control apparatus according to claim 1, wherein the feeding mechanism starts feeding the film upon detecting that a power source has been supplied to the feeding mechanism.

6. A film control apparatus according to claim 5, further including a non-volatile memory that stores a feeding incomplete status which indicates that the film has not been fed to the stopping position associated with a respective photo frame after the film feeding starts, and the feeding mechanism starts feeding the film upon detecting that the power source has been supplied to the feeding mechanism and the feeding incomplete status is stored in the non-volatile memory.

7. A film feed control apparatus according to claim 6, further including a memory that stores information and a magnetic writing circuit that writes the information stored in the memory onto a memory area of each photo frame of the film during film feeding, and an inhibitor that inhibits the magnetic writing circuit from writing the information when the feeding incomplete status is stored in the non-volatile memory.

8. A film feed control apparatus for feeding film in a film feeding direction and stopping the film at predetermined stopping positions, the apparatus having feeding means for feeding the film, the film including a plurality of photo frames with each photo frame associated with one stopping position and at least one perforation having a pair of facially opposing edges extending perpendicularly to the film feeding direction, the film feeding control apparatus comprising:

edge detecting means for detecting edges of the at least one perforation of the film as the film is fed in the feeding direction;

film advancement detecting means for detecting a first amount of film that is fed from a time when the film feeding starts to a time when a first edge of the at least one perforation is detected by the edge detecting means, and a second amount of film that is fed from the time when the first edge of the at least one perforation is detected to a time when a last remaining edge of the at least one perforation is detected by the edge detecting means; and control means for determining, subsequent to the time when film feeding starts, a film feeding start position based upon whether a threshold amount of time has been exceeded for the film advancement detector to detect the first amount of film and a time for the feeding means to stop feeding the film at the one stopping position associated with a respective one of the plurality of photo frames based upon a total number of edges detected by the edge detecting means and the film feeding start position.

9. A film feed control apparatus according to claim 8, wherein the film advancement detecting means is a timing means for measuring a time interval that extends from the time when the film feeding starts to the time when the edge of the at least one perforation is detected, and a time interval that extends from the time when the edge of the at least one perforation is detected to the time when the last remaining edge is detected.

10. A film feed control apparatus according to claim 9, wherein multiple perforations are defined at an edge portion of each photo frame of the film, and the control means includes time judging means for judging whether the time intervals measured by the timing means are less than a predetermined time interval, and stop control means for controlling the feeding means to stop the film when the judging means judges that the time intervals are shorter than the predetermined time interval for a predetermined number of times.

11. A film feed control apparatus according to claim 10, wherein the control means includes edge judging means for judging whether an edge detected by the edge detecting means is on a leading or trailing side of the film, and subsequent to the time when film feeding starts, the stop control means controls the feeding means to stop the film when the judging means judges that the time intervals are shorter than the predetermined time interval for a predetermined number of consecutive times and when the edge judging means judges that a last edge detected was on the trailing side of the film.

12. A film feed control apparatus according to claim 8, wherein the feeding means starts feeding the film upon detecting that a power source has been supplied to the feeding means.

13. A film control apparatus according to claim 12, further including a non-volatile memory means for storing a feeding incomplete status which indicates that the film has not been fed to the stopping position associated with the at least one perforation after the film feeding starts, and the feeding means starts feeding the film upon detecting that the power source has been supplied to the feeding means and the feeding incomplete status is stored in the non-volatile memory means.

14. A film feed control apparatus according to claim 13, further including a memory means that stores information and a magnetic writing means that writes the information stored in the memory onto a memory area of each photo frame of the film during film feeding, and an inhibiting means that inhibits the magnetic writing means from writing the information when the feeding incomplete status is stored in the non-volatile memory means.

15. A film feed control method for feeding film in a film feeding direction and stopping the film at predetermined stopping positions, the film being fed with an electrical feeding mechanism, the film including a plurality of photo frames with each photo frame associated with one stopping position and at least one perforation having a pair of facially opposing edges extending perpendicularly to the film feeding direction, the method comprising the steps of:

detecting edges of the perforations of the film as the film is fed in the feeding direction with an edge detector;

detecting a first amount of film that is fed from a time when the film feeding starts to a time when a first edge of the at least one perforation is detected, and a second amount of film that is fed from the time when the first edge of the at least one perforation is detected to a time when a last remaining edge of the at least one perforation is detected with a film advancement detector; and determining, subsequent to the time when film feeding starts, a film feeding start position based upon whether a threshold amount of time has been exceeded for the film advancement detector to detect the first amount of film and a time for the feeding mechanism to stop feeding the film based upon a total number of edges detected by the edge detector and the film feeding start position with a controller.

16. A film feed control method according to claim 15, wherein the step of detecting a first amount of film includes measuring a time interval that extends from the time when the film feeding starts to the time when the first edge of the at least one perforation is detected, and a time interval that extends from the time when the first edge of the at least one perforation is detected to the time when a last remaining edge is detected with a timing mechanism.

17. A film feed control method according to claim 16, wherein multiple perforations are defined at an edge portion of each photo frame of the film, and the step of measuring a time interval includes judging whether the time intervals are less than a predetermined time interval with a judging mechanism, and controlling the feeding mechanism to stop the film when the judging mechanism judges that the time intervals are shorter than the predetermined time interval for a predetermined number of times.

18. A film feed control method according to claim 17, wherein the step of determining a time interval includes judging whether an edge detected by the edge detecting mechanism is on a leading or trailing side of the film with an edge judging mechanism, and subsequent to the time when film feeding starts, controlling the feeding mechanism to stop the film when the judging mechanism judges that the time intervals are shorter than the predetermined time interval for a predetermined number of consecutive times and when the edge judging mechanism judges that a last edge detected was on the trailing side of the film.

19. A film feed control method according to claim 18, further including the step of starting to feed the film upon detecting that a power source has been supplied to the feeding mechanism.

20. A film feed control method according to claim 19, further including the step of storing a feeding incomplete status, which indicates that the film has not been fed to the stopping position associated with a respective one of the photo frames after the film feeding starts, in a non-volatile memory, and starting to feed the film upon detecting that the power source has been supplied to the feeding mechanism and the feeding incomplete status is stored in the non-volatile memory.

21. A film feed control method according to claim 20, further including the step of writing information on a memory area of each photo frame of the film during film feeding, and inhibiting the writing of the information when the feeding incomplete status is stored in the non-volatile memory.

22. A film feed control apparatus for feeding film in a film feeding direction and stopping the film at predetermined stopping positions, the apparatus having an electrical feeding mechanism for feeding the film, the film including a plurality of photo frames and a pair of perforations associated with each photo frame and disposed apart from one another in the film feeding direction, each perforation having facially opposing edges extending perpendicularly to the film feeding direction, the edges being located at predetermined positions relating to the photo frames with each photo frame associated with one stopping position, the film feed control apparatus comprising:

an edge detector that detects the edges of the perforations of the film as the film is fed in the film feeding direction; and a controller that determines a film feeding start position based upon an amount of the film fed from a start of the film feeding to when a first edge is detected and determines the film feeding stop position based on the film feeding start position wherein the controller, subsequent to when film feeding starts, determines the film feeding start position and a time for the feeding mechanism to stop feeding the film so that either:

the controller stops the film feeding at the stopping position associated with the pair of perforations either after the timer measures the first increment of time exceeding the threshold amount of time and the subsequent increments of time being less than the threshold amount of time or after the timer measures the first increment of time being less than the threshold amount of time and at least two subsequent increments of time being less than the threshold amount of time; or the controller stops the film feeding at a subsequent stopping position associated with a succeeding pair of perforations after the timer measures either the first increment of time and a first subsequent increment of time being less than the threshold amount of time while a next subsequent increment of time exceeds the threshold amount of time or the first increment of time being less than the threshold amount of time while the first subsequent increment of time exceeds the threshold amount of time.

23. A film feed control apparatus according to claim 22, wherein the controller has a timer which measures a feeding time from the start of the film feeding to when the first edge is detected, the controller determines the film feeding start position based upon the time measured by the timer.

24. A film feed control apparatus according to claim 23, wherein the timer measures a first increment of time based upon a threshold amount of time commencing from the film feeding start position to the first detected edge and measures a subsequent increment of time measured between consecutive detected edges of the pair of perforations.

* * * * *